United States Patent Office 3,573,122
Patented Mar. 30, 1971

3,573,122

PREPARATION OF CONDUCTIVE MATERIALS

Franciszek Olstowski, Freeport, Tex., and James Lawrence Amos and Herbert H. Bauss, Midland, Mich., and Oliver Osborn and John D. Watson, Sr., Lake Jackson, Tex., assignors to The Dow Chemical Company, Midland, Mich.

No Drawing. Continuation of application Ser. No. 620,557, Mar. 3, 1967, which is a continuation of application Ser. No. 441,894, Mar. 22, 1965, both now abandoned. This application Aug. 23, 1968, Ser. No. 755,006

Int. Cl. H01m *13/04*

U.S. Cl. 136—122 6 Claims

ABSTRACT OF THE DISCLOSURE

This invention provides a method for rendering conductive materials which are normally substantially non-conductive by admixing with the non-conductive material sufficient vermicular expanded graphite having a bulk density of less than about 2 lbs. per cubic foot to provide an amount of from 0.05 to 40 percent by weight of graphite based on the total weight of the mixture. One of the illustrated utilities of this invention is to provide a highly conductive battery cathode composition.

This application is a continuation of application Ser. No. 620,557, filed Mar. 3, 1967, now abandoned, which in turn is a continuation of application Ser. No. 441,894, filed Mar. 22, 1965, now abandoned.

This invention relates to a method of rendering substantially non-electrically and non-thermally conductive materials conductive and, more particularly is concerned with the addition of expanded particulate graphite to a substantially non-conductive material thereby increasing the electrical and/or thermal conductivity of said material and to products prepared thereby.

It is a principal object of the instant invention to provide a method for preparing electrically and/or thermally conductive materials and structures using as a base material, materials which are substantially insulators with respect to thermal and electrical energies.

Other objects and advantages of the instant invention will become more apparent from reading the detailed description thereof set forth hereinafter.

In general, the present invention is a method of rendering normally substantially non-electrically and/or non-thermally conductive or low conductive materials conductive. The instant method comprises combining a substantially non-electrically and non-thermally conductive material with a vermicular expanded graphite, said graphite having a bulk density of less than about 2 pounds per cubic foot (lb./ft.$^3$) to provide an amount of from about 0.05 to about 40 percent by weight vermicular expanded graphite based on the total weight of the mixture. The resultant mixture containing a major portion of said substantially non-conductive material and a minor portion of expanded vermicular graphite is thereby rendered conductive. Expanded natural flake graphite of apparent bulk densities above about 2.0–2.2 lbs./ft. does not offer an appreciable increase in electrical conductivity at a given loading, when compared to the commonly used acetylene black powders or the partially expanded natural flake graphite known heretofore. However, expanded natural flake graphite having apparent bulk densities of less than about 2 lbs./ft.$^3$ offers surprisingly large increases in electrical conductivity when compared with the above named agents when used in similar products.

Non-conductive materials which particularly are suitable for use in the practice of the present invention are naturally occurring and synthetic organic and inorganic construction, coating and adhesive materials such as, for example, organic polymeric substances, inorganic cements and plasters, paint, resins and the like as well as materials which will yield carbonaceous chars when pyrolyzed.

Expanded graphite used in the practice of the present invention is prepared from particulate naturally occurring crystalline flake graphite and crystalline lump graphite, flake graphite being preferred. The crystalline graphite is given a particular acid treatment and the so-treated flake is heated at certain operable temperatures thereby expanding into the low density vermicular feed stock suitable for use in the present invention. The particle size of graphite starting material to be used is not critical although ordinarily particles of from about 10 to about 325 mesh U.S. Standard Sieve, preferably 10 to 60 mesh, are used. Normally unexpanded natural graphite flake has a bulk density of from about 47 to 60 lbs./ft.$^3$ in the above stated 10 to 60 mesh particle sizes.

The present invention can be further illustrated by a number of applications as set forth hereinafter.

In one embodiment of the instant method vermicular expanded graphite is incorporated into a matrix of a normally non-conductive polymer. The expanded graphite can be physically mixed with polymer or copolymer powders, liquid polymers and copolymers, and even with liquid monomers that will be subsequently polymerized. The expanded graphite-polymer mixture can then be molded and set following normal polymer handling and processing procedures with or without compressing, depending on the desired use. The resulting solid organic polymer shapes containing mixed-in vermicular expanded graphite have bulk electrical conductances greatly exceeding that of solid polymer shapes containing other known types of carbon or graphite at the same free-carbon concentrations.

Polymeric substances suitable for use herein include all natural or synthetic organic solid polymers or copolymeric systems and include, for example, polyethylene, polyvinyl chloride, phenol formaldehyde, polystyrene, epoxides, polytetrafluoroethylene, silicone rubbers, and copolymers of the same.

In one particular application of the instant invention, vermicular expanded graphite is incorporated into adhesives (that require polymerization curing) thereby rendering said adhesive electrically conductive. Such an adhesive when used to join various parts to one another could then be heated by passing an electrical current therethrough thereby accelerating the setting and curing of the adhesive.

Typical of the adhesives suitable for use herein that require polymerization curing include but are not limited to phenolics, epoxides, polyesters and the like.

Other applications of the instant novel invention resides in methods of using a vermicular expanded graphite impregnated thermosetting or thermoplastic resin in resistance heaters and capacitors.

Thermosetting resins suitable for use in these applications include, for example, epoxy resins, phenol-formaldehyde, urea-formaldehyde, melamine, silicones, and polyesters and urethanes.

Furthermore, we have unexpectedly discovered that such solid polymeric structures having greatly improved electrical conductances can be prepared by preshaping or pre-forming the low bulk density expanded vermicular graphite (for example by compressing said vermicular graphite into predetermined shape or form), subsequently soaking the vermicular graphite structure with a low viscosity liquid prepolymer system and then curing to yield the electrically conductive solid polymer shape.

In carrying out the instant novel method for producing solid organic shapes by pre-forming vermicular expanded graphite and soaking said graphite form in a predetermined pre-polymer system, the vermicular expanded graphite is compressed and formed in a suitable mold or form to yield rectangular solids, spheres, toroids, cylinders and the like or solids having complex surface indentations. The vermicular expanded graphite should be volumetrically compressed by at least a factor of two, and preferably should undergo a volumetric compressive change of from about 4 to about 20 times that of the loose expanded vermicular graphite. Thus, for example, loose expanded vermicular graphite, having an apparent bulk density of about 0.2 lb.ft.$^3$ is compressed to a predetermined shape having a bulk density in the range of from about 0.8 to about 10 lb./ft.$^3$. The amount of compression that the loose expanded vermicular graphite is subjected to is dependent on the final bulk density of the plastic-graphite matrix desired, the rigidity required for the graphite preform, the degree of impermeability in the graphite required for the appropriate prepolymer system and the degree of electrical conductivity desired in the plastic-graphite matrix. As the degree of compression on the loose vermicular graphite increases, the bulk density, rigidity, impermeability and electrical conductance of the resulting form increases.

The impregnation of the shaped, self-cohered, compressed vermicular graphite mass by the desired polymeric substance comprises allowing a liquid form of the polymer to penetrate and occupy the volume between the compressed vermicular graphite particles. It is readily seen that a liquid prepolymer system having a low viscosity can more easily penetrate the compressed vermicular graphite shape.

The prepolymer soaked graphitic matrix can be cured by any of a number of conventional curing techniques including for example amines or organic acid crosslinkers when the prepolymer is an epoxy, heat when the prepolymer is condensable such as phenol-formaldehyde or urea-formaldehyde, or heat crosslinkable polymers.

Polymeric substances suitable for use in the instant novel method include any organic polymer in liquid or solution form that can be cured to yield a solid resin and include epoxy resins, polyvinyl chloride, silicone rubber, dissolved methyl methacrylate, polyurethane, phenol formaldehyde and the like.

Many of the organic substances suitable for use in this invention will yield a "cementing-char" carbon residue when pyrolyzed at a temperature at least 900° C. Thus the pyrolyzed organic substance containing from about 2 to about 40 weight percent of expanded vermicular graphite (the percentage being based on the pre-pyrolyzed weight of the organic material) will carbon-bond with the expanded vermicular graphite, thereby forming a low-density, electrically conductive unitary mass.

Char yielding bonding agents suitable for use herein include, for example, asphalt, tar, sugars, phenol formaldehyde resins. If necessary for ease of mixing and shaping, a solvent such as xylene, kerosene, and the like can be used. Preferably where the above char-yielding bonding agents are used as the cementing agents, the weight ratio of expanded graphite to the char yielding bonding agent should be in the order of about 1:3 to about 1:12 (excluding the weight of the solvent, if used).

Such a carbon-cemented structure has a low bulk density, good mechanical strength and is highly gas permeable.

The low density carbon-cemented structures find particular utility as a brick refractory thermal insulator, a high temperature-low bulk density acoustical tile, a float on molten materials and the like.

In another embodiment of the method of the instant invention, vermicular expanded graphite can be incorporated into normally non-conductive, film-forming materials, which when applied to a surface and dried, yield a highly (electrically) conductive surface.

The term "film-forming" material as used herein includes solutions, emulsions, or suspensions of materials which will dry in a continuous film, such as varnishes or paints and other mechanical mixtures of film-formers and pigments, pigment extenders (fillers), vehicles, thinners, driers, plasticizers and the like.

The instant novel electrically conductive film-former, is prepared by mixing said film-former with a vermicular expanded graphite having an apparent bulk density of from about 0.1 to about 2 lb./ft.$^3$ in an amount of from about 0.2 to about 20 percent based on the weight of the total wet graphite-film former mixture.

The vermicular expanded graphite thus incorporated into the film-former system, yields, upon surface application an electrically conductive film much lower in electrical resistance at a given loading (that is, mass of graphite per unit of surface coated) than other common forms of highly conductive carbon such as flake graphite, graphite powder, or acetylene black.

Examples of film-formers particularly suitable for use herein include, but are not limited to pigmented latex, alkyd, vinyl, chloro-rubber, butyl-phenolic paints, varnishes, and natural and synthetic lacquers.

Ordinarily substantially non-conductive construction materials, such as inorganic cements and asphaltic materials can be rendered electrically conductive in accordance with the method of the instant invention by employing vermicular expanded graphite as an aggregate material in said construction material.

In carrying out the present method, from about 0.5 to about 40 weight percent of expanded graphite is mixed with a substantially non-conductive construction material. The mixture thus formed is then applied as needed.

Suitable construction materials for use with the present invention include inorganic cements as well as asphaltic materials. Typical of the inorganic cements which may be employed are: portland cement, gypsum, lime, calcium aluminate, magnesium oxychloride cement, sodium silicate (water-glass), and the like.

Depending on the construction material employed, slight variances in the technique of mixture with expanded graphite as well as the amounts of expanded graphite may be appropriate. For instance, when expanded graphite is mixed with asphaltic materials, it is generally helpful to thin or dilute the asphalt with a suitable solvent to facilitate mixing and, if necessary spreading as pavement. The solvent is allowed to evaporate leaving an asphalt-expanded graphite construction material suitable generally as paving material. In practice, it is to be preferred that the solvent-containing mixture be spread as pavement, roofing, or the like prior to evaporation of the solvent therefrom. In this manner the spreading, smoothing, etc. of the material are also facilitated.

When asphalt is the selected construction material amounts of from 1 to 12 weight percent expanded graphite are operable, with 8 to 10 weight percent being preferred.

When inorganic cements are employed, the expanded graphite is preferably mixed therewith before the cement (with or without inorganic aggregates) is mixed with water, but may be wet mixed if desired. Gentle tumbling is preferred so as not to "break-up" the vermicular graphite particles to any great extent. Amounts of expanded graphite of from 0.5 to 40 weight percent are operable, the amount depending on the density and electrical resistivity desired in the final product. Generally, as the amount of expanded graphite increases, the conductivity increases and the bulk density decreases.

Once the expanded graphite is in mixture with the asphalt or cement, the mixture is handled in the manner generally employed for those materials.

Graphite-containing materials of the present invention may be used alone, or in combination with other materials. For instance, the electrically conductive material of the present invention may be used as an interlayer, top layer, or a base layer in conjunction with another desired layer or layers.

To take advantage of the electrical conductivity of the present material, it is necessary that some means of electrical connection with the expanded graphite be provided. In the case of flooring or paving laid on damp ground to provide a static free surface, the ground connection is sufficient. Usually, however, metal electrodes are embedded in the expanded graphite material to provide electrical connection therewith.

In another variation of the method of the instant invention, expanded vermicular graphite to be used in battery cathode compositions is blended with cathode-reducible, electrically poor or non-conductive compounds such as manganese dioxide, vanadium pentoxide, silver oxide, silver halides, mercury salts, cuprous oxide, chromium oxide, lead oxide and certain organic compounds, such as dinitrobenzene, dibromodimethylhydantoin, dichloro-dimethylhydantoin, hexachloromelamine, and the like, in finely divided powder form. The mix can then be compressed into the desired shape.

Alternatively, the cathode mix can be prepared by mixing certain metal oxides (for example, manganese oxide, nickel oxide, copper oxide, and chromium oxide) with the unexpanded flake graphite. The graphite is treated with an oxidizing acid (as described hereinafter) either before or after the addition of metal oxides thereto, and is subsequently heat expanded. The mix is then compressed into the desired shape.

Generally the amount of expanded graphite used in the cathode formulations ranges from about 2 to about 40 weight percent and preferably from about 5 to about 25 weight percent of the active cathode ingredient. Where too low an expanded graphite concentration (for example, about one weight percent) is used, the cathode compact subsequently produced will have too high an electrical resistance. If a compact contains more than about 40 weight percent, the increase in conductivity occurs at the expense of reducing the amount of active cathode compound.

The use of expanded graphite as the dispersed conductive phase for compaction into dry cell cathode compositions instead of the powdered graphite or acetylene black, as is ordinarily used, offers several advantages. There is a marked decrease in electronic resistance in the cell thereby allowing for a larger fraction of available electrical power for external work. In addition, the use of expanded graphite aids in imparting structural integrity to the cathode and readily can be wetted or retain liquid electrolytes.

Such cathodes containing compressed expanded vermicular graphite find utility in dry cell primary batteries and in rechargeable secondary batteries.

In preparing the expanded graphite for use in the present invention, a particulate natural flake or lump crystalline graphite is contacted at about room temperature with (1) a mixture of from about 8 to 98 weight percent concentrated sulfuric acid (at least about 90 weight percent $H_2SO_4$) and from about 92 to about 2 weight percent concentrated nitric acid (at least about 60 weight percent $HNO_3$), or (2) fuming nitric acid, or (3) fuming sulfuric acid, or (4) concentrated sulfuric acid (at least about 90 weight percent $H_2SO_4$), or concentrated nitric acid (at least about 60 weight percent $HNO_3$) plus at least about 2 weight percent of a solid inorganic oxidizer such as, for example manganese dioxide, potassium permanganate, chromium trioxide, potassium chlorate and the like. The resulting mix components usually are employed on a weight proportion basis of from about 0.2–2/1 (acid member/graphite). These are maintained in contact for at least about one minute, although a lengthy contact time of hours or days is not detrimental. The acid-treated graphite now expandable, is separated from any excess acid, washed and dried if desired. The acidified graphite is then rapidly heated until exfoliation or expansion to an apparent bulk density of less than about 2 lbs./ft.$^3$ occurs. The preferred method of heating is to contact the acidified graphite with a hydrocarbon flame (for example, a propane flame).

Alternatively, another method of preparing the expandable graphite which is subsequently expanded for use in the method of the instant invention is to treat with an aqueous peroxy-halo acid, preferably perchloric or periodic acid, using an acid concentration of from about 2 to about 70 weight percent or more and an acid/graphite weight proportion of from about 0.05–2/1. The acid treated graphite, now expandable, is separated from excess acid, and dried if desired and heated to give the expanded feed stock.

The natural crystalline graphite also can be anodically electrolyzed in an aqueous acidic or aqueous salt electrolyte at an electrolyte temperature of from about 0 to about 80° C. at a minimum cell potential of about 2 volts. The total quantity of electricity passed is equivalent to from about 10 to about 500 ampere-hours per pound of graphite. The electrically treated graphite, now expandable is separated from the electrolyte solution and heated. The so-formed expanded graphite feed stock has a bulk density as low as 0.1 lb./ft.$^3$ and preferably less than about 2 lb./ft.$^3$.

The actual apparent bulk density of the final expanded product is determined in part by the temperature employed in the expansion operation. Satisfactory expansion of the aqueous peroxy-halo acid treated or anodically electrolyzed crystalline natural graphite results at temperatures above about 150–200° C. However, ordinarily a gaseous environment having a temperature of from about 750 to about 2000° C. or higher is used with instantaneous heating-up of the graphite to about 1000° C. or higher being preferred. Generally, as the temperature increases, the bulk density of the expanded product decreases. Ordinarily graphite from all the acid treatments set forth hereinbefore are subjected to hydrocarbon fuel flames, e.g. propane torch (flame causing graphite to attain a temperature of about 1100° C.), oxyacetylene torch (flame causing graphite to attain a temperature of about 1500° C. or higher) etc. for expansion. Generally, the acid-treated or anodically electrolyzed graphite flake particulate material is placed in contact with the flame thereby to effect expansions of from 200 to 600 fold substantially instantaneously, e.g. within a second.

The time required for expansion also is dependent to a large extent on the heating temperature. Generally as the temperature rises, the time required for heating decreases. However, the operable expansion temperature range set forth herein ordinarily the expansion is completed in less than a minute and a maximum heating period of five minutes has been found to be more than sufficient.

The expanded graphite resulting from this process is a vermicular, particulate product having a low apparent bulk density as set forth hereinbefore in comparison to the high density of crystalline graphite starting material. (To illustrate, a commercially available Madagascar flake graphite used as a starting material having a carbon content of greater than 80% and a nominal mesh size of from about 30 to about 50 U.S. Standard Sieve had an apparent bulk density of about 51.2 pounds per cubic foot.) The term "apparent bulk density" as used herein is the density determined from the volume occupied by a given mass of the product subjected to free fall (by gravity) into an open top container, e.g. a graduated cylinder.

The following examples further illustrate the present invention and in no way are meant to limit it thereto.

EXAMPLE I

Various forms of expanded graphite and other forms of carbon (as controls) were provided and incorporated into a number of different polymeric substances in various manners to show the effect of these materials on the electrical conductivities of the polymeric substances.

For these studies vermicular expanded graphite as described hereinbefore was prepared as follows. About 20 grams of Standard No. 1 natural graphite flake (that is graphitic carbon having flake sizes ranging from about 20 mesh to about 60 mesh and a bulk density of about 47 lb./ft.$^3$) was mixed with about 15 grams of concentrated sulfuric acid and about 10 grams of concentrated nitric acid. After the acid-treated graphite flake was maintained at room temperature for about 5 minutes, the flake was washed free of acid with water, spread out in a thin layer and subjected to direct contact with a propane-air flame and thereby rapidly heated to a temperature above 800° C. The graphite flakes, under flame, expanded to yield long worm-like structures of exceedingly low bulk densities (about 0.1 to 0.2 lb./ft.$^3$).

In a second preparation about 20 grams of a natural graphite flake having particle size of about 14 to 40 mesh was wetted with about 10 grams of concentrated sulfuric acid and about 5 grams of nitric acid for about 2 minutes at room temperature. The graphite flakes were washed free of acid with water and expanded by direct contact with a propane-air flame. The resulting expanded graphite was a particulate vermicular product having an apparent bulk density of about 0.2 lb./ft.$^3$.

Run A

Microfine polyethylene powder was mixed in and homogeneously blended with various forms and amounts of particulate carbon (at various concentrations of free carbon in the polymer). These resulting mixtures were compressed in a 2 inch diameter die to about 2000 p.s.i. and then baked in an oven at about 125° C. to about 135° C. for about 30 minutes. The resulting cured poly- The results of these tests are shown in the following Table I.

TABLE I.—SPECIFIC BULK RESISTIVITY (OHM-INCHES) OF FREE CARBON IN POLYETHYLENE

| Type of carbon | Weight percent free carbon | | | | | | | |
|---|---|---|---|---|---|---|---|---|
| | 4.75 | 10 | 11.1 | 20 | 25 | 30 | 33 | 40 |
| Unexpanded No. 1 Flake Graphite (bulk density=47.5 lb./ft.$^3$) | | | | 187,000 | 23,000 | 43.7 | ------ | 18.7 |
| Acetylene black (bulk density=4.9 lb./ft.$^3$) | | 500 | ------ | 12 | | | | 2.5 |
| Flame-Expanded Graphite (bulk density=2 lb./ft.$^3$) | 12,500 | 37.8 | ------ | 5.0 | | | .2 | ------ |
| Flame-Expanded Graphite (bulk density=1 lb./ft.$^3$) | | | 175 | 1.1 | | | .05 | ------ |
| Flame-Expanded Graphite (bulk density=0.2 lb./ft.$^3$) | 12 | ------ | 0.75 | 0.12 | | | .018 | ------ |

Run B

A liquid epoxy resin (diglycidyl ether of bisphenol A) having a molecular weight of about 328 was premixed with diethylene triamine hardener in a weight ratio of resin to hardener of about 10. Various types of free carbon were mixed in with the resin-hardener mixture. The blended free carbon-resin mixture was cast into a 1-inch wide by 1-inch deep by 2-inch long silicone rubber mold and cured at room temperature for about 24 hours. The specific bulk resistance was measured for each sample and recorded below in Table II.

In a control run a compact of a portion of the above epoxy resin was prepared as described hereinbefore except that no carbon of any form was added thereto. The bulk resistivity of the carbon free epoxy compact was greater than $5\times10^{10}$ ohm-inches.

Run C (a) An expanded natural flake graphite having an initial apparent bulk density of about 0.2 lb./ft.$^3$ was compressed a slight amount in a rectangular mold to yield a low bulk density, self-cohered preformed structure (hereinafter referred to as a preform) having the dimensions 0.75 inch by 1.25 inches by 5 inches and weighing about 1.05 grams (apparent bulk density of about 0.85 lb./ft.$^3$).

TABLE II.—SPECIFIC BULK RESISTIVITY (OHM-INCHES) OF FREE CARBON IN EPOXY RESINS

| Type of carbon | Weight percent free carbon | | | | | |
|---|---|---|---|---|---|---|
| | 0.8 | 1.7 | 3.3 | 6.5 | 25.6 | 34 |
| No. 1 Natural Graphite Flake (bulk density=47.5 lb./ft.$^3$) | | | | | 40,000 | 4,000 |
| No. 635 Natural Graphite Flake (−325 mesh) (bulk density=31 lb./ft.$^3$) | | | | | | $>10^6$ |
| Acetylene Black (bulk density=4.9 lb./ft.$^3$) | | 25,000 | 1,100 | 300 | | |
| Flame Expanded Graphite (0.2 lb./ft.$^3$) | 15 | 35 | 1.5 | 0.5 | | |

The preform was then immersed in liquid epoxy resin of the same composition employed in Run B, the liquid epoxy resin being soaked up into the interstices of the preform. The resulting soaked graphite preform cured at room temperature within about 24 hours.

The so-produced epoxy resin filled-graphite had a cured weight of about 53.6 grams and contained about 1.86 weight percent graphite. The specific bulk resistivity of this structure was determined to be about 0.376 ohm-inch.

(b) In a second run, about 1 gram of the same vermicular expanded graphite was compressed into a flat, about 40 minutes. The cured rubbery products were then removed from the mold and cut into 1 inch wide strips and their specific bulk resistivities were determined and recorded in Table III.

In a control run, a polyvinyl chloride compact was prepared as described above except that no carbon of any form was added thereto. The carbon-free polyvinyl chloride compact had a specific resistance of greater than $5\times10^{10}$ ohm-inches.

Run E (a) The same vermicular expanded graphite as used in the Run C was compressed into a board-like shape having an apparent bulk density of about 1.2 lb./ft.$^3$. This was immersed in liquid plasticized polyvinyl chloride of the same composition as described in Run D, the polymer thereby soaking up into the graphite preform. The resulting polyvinyl chloride graphite composite was cured at about 130 to 140° C. Analysis of this product for free carbon indicated that it contained about 3.36 weight percent expanded graphite. This product was found to have a specific resistance of about 9.4 ohm-inches.

(b) Another preform was made from the expanded graphite and was compressed to a bulk density of about 1.0 lb./ft.$^3$ and was allowed to soak up another portion of polyvinyl chloride plastisol and similarly cured. This cured sample contained about 2.64 weight percent expanded graphite and was found to have a specific resistance of about 11.8 ohm-inches.

TABLE III.—SPECIFIC BULK RESISTIVITY (OHM-INCHES) OF FREE CARBON IN POLYVINYL CHLORIDE

| Type of carbon | Weight percent free carbon 5 | 10.0 | 20.0 | 25.0 | 40.0 |
|---|---|---|---|---|---|
| No. 1 Natural Graphite Flake (unexpanded) | | | | 1,000,000 | 5,000 |
| Flame Expanded Graphite (0.2 lb./ft.$^3$) | 1,000,000 | 1,250 | 750 | 37.5 | ------ |

Run F

About 2 grams of a vermicular expanded graphite having an apparent bulk density of about 0.18 lb./ft.$^3$ was blended with about 18 grams of phenol-formaldehyde resin powder. This blend was compressed into a wafer and cured at about 4000 p.s.i. at about 320° F. for about 10 minutes. The resulting cured wafer had a specific resistance of about 0.376 ohm-inch.

In a control run, a phenol formaldehyde wafer was prepared as described above except that no carbon of any form was added thereto. The carbon-free wafer had a specific resistance of greater than $5\times10^5$ ohm-inches.

Comparison run

A mixture was prepared according to the method described in U.S. Patent No. 2,683,669 comprising about 90 grams of phenol-formaldehyde powder blended with about 10 grams of 2-micron particle size colloidal graphite powder resulted in a product having a specific resistivity of about 13.8 ohm-inches.

It is to be noted that the flame-expanded vermicular graphite of this invention yield carbon-filled polymer composites which are appreciably more conductive than the other forms of elemental carbon. Further, an increase in electrical conductivity is apparent for structures prepared by the preform-soak method of the instant invention using reduced quantities of the expanded vermicular graphite for similar compositions wherein the expanded graphite and polymer are premixed before forming.

In a manner similar to the foregoing small quantities of low bulk density vermicular expanded graphite were blended into polytetrafluoroethylene or silicone rubber thereby producing respectively an electrically conductive polytetrafluoroethylene and an electrically conductive silicone rubber. In addition, similarly vermicular expanded graphite was preformed and soaked in liquid silicone rubber, polymethyl methacrylate (dissolved in ethylene dichloride), polyurethane (liquid prepolymer) and phenol-formaldehyde (dissolved in alcohol) and the resulting structures cured by conventional technique thereby producing the corresponding polymeric structures having superior electrical conductivity properties.

EXAMPLE II

An electrically conductive adhesive was prepared in accordance with the present invention employing the following operational procedure:

About 0.1 gram of expanded vermicular graphite was blended with about 1.0 gram of an adhesive comprising a copolymer of ethylene and acrylic acid, containing about 5 percent acrylic acid. A portion of the resulting blend was applied betwen 2 pieces of wood, thereby joining said wood. Phosphor bronze electrodes were attached to the adhesive layer and an electrical current of about 1 ampere at 30 volts was applied to heat the joint and cause the resin to join the two wooden pieces. The heating step was complete in about two minutes and a strong bond was formed.

The same copolymer of ethylene and acrylic acid having no expanded graphite blended therein was applied between two similar bodies as an adhesive but could not be heated sufficiently to produce a bond between the wooden pieces.

EXAMPLE III

A resistance heater was made in accordance with the instant invention as follows.

About 150 parts by weight of an epoxy resin (diglycidyl ether of bisphenol A containing 20 percent by weight of butyl glycidyl ether) was blended with about 18 parts by weight of diethylene triamine as a curing agent and about 18.5 parts by weight of expanded vermicular graphite. The blend was spread onto a rectangular mat of Fiberglas, which in turn was laid on a 1 inch thick sheet of polyurethane foam. Copper strip electrodes were embedded in the epoxy resin mix, one at each end along the shortest dimension of the so-formed rectangular panel. A second mat of Fiberglas was placed on top of the resin mix thus forming a sandwich panel.

The entire asembly was allowed to stand at room temperature for several hours and the epoxy hardened. The two electrodes were connected to a source of electricity and about 4.75 amperes of current at 100 volts was passed through the resin layer. The heat output of the panel was about 169.2 B.t.u./ft.$^2$/hr.

EXAMPLE IV

A novel variable capacitor was prepared in accordance with the instant invention as follows.

About 50 grams of the epoxy expanded vermicular graphite mix described hereinbefore in Example III was was allowed to harden overnight at room temperature in a cylindrical type cup. The hardened mixture was sawed into a block having dimensions of about 1⅝ inches by 1½ inches by 1 inch. The so formed block was drilled and tapped along its longest dimension so that it could receive a 6–32 screw. Two of such screws having a total length of less than 1⅝ inches were inserted one at either end of said block. Electrical contact was then made between each screw and a resistance-capacitance-inductance bridge comparator. Capacitance values were determined at various screw (or electrodes) distances from each other as shown in Table IV.

TABLE IV

| Distance between electrodes (inch): | Capacitance (millimicro farads) |
|---|---|
| 1/32 | 1415 |
| 2/32 | 825 |
| 3/32 | 725 |
| 4/32 | 669 |
| 5/32 | 618 |
| 6/32 | 546 |
| 7/32 | 485 |
| 8/32 | 380 |
| 9/32 | 315 |
| 10/32 | 261 |
| 11/32 | 176 |
| 12/32 | 66 |
| 13/32 | 52 |
| 14/32 | 43 |
| 15/32 | 36 |

EXAMPLE V

Electrically conductive paint systems were prepared as follows.

Run A

Various amounts of differing kinds of elemental carbon were blended into a latex paint system. The composition of the starting latex was:

32.7 weight percent pigment, and
67.3 weight percent vehicle, the vehicle consisting of 69.3 weight percent $H_2O$, and 30.7 weight percent synthetic rubber (latex).

The following kinds of carbon-filled latexes were blended:

TABLE V

| Mix No.: | Carbon type | Concentration (Wet), wt. percent |
|---|---|---|
| 1 | Vermicular expanded graphite [1] | 2.56 |
| 2 | Acetylene black | 4.23 |
| 3 | do [9] | 2.56 |
| 4 | Vermicular expanded graphite [1] | 1.37 |
| 5 | do [1] | 4.76 |
| 6 | No. 1 Grade Natural Flake Graphite (large flakes) | 17.4 |
| 7 | Fine Graphite powder (−352 mesh) | 16.8 |
| 8 | do | 28.6 |

[1] Bulk density=0.5 pound per cubic foot.

Each of the above latex paint compositions were applied to plywood panels (9″ x 9″ squares) and allowed to air dry; the dried panels were weighed to determine the carbon loading per unit of painted surface area, and the paint film electrical surface resistance was determined. The summary data is tabulated as follows in Table VI.

TABLE VI

| Carbon Type | Carbon concentration (Wet basis), wt. percent | Carbon loading on paneled surface, gm./ft.² | Surface film resistance of a 9″ x 9″ square, ohms/square |
|---|---|---|---|
| Expanded graphite | 2.56 | 1.92 | 160 |
| Acetylene black | 4.23 | (1) | (1) |
| Do | 2.56 | 2.08 | 2,600 |
| Expanded graphite | 1.37 | 1.11 | 100,000 |
| Do | 4.76 | 2.23 | 29 |
| Large flake graphite | 17.4 | 14.1 | 3,400 |
| Fine graphite powder | 16.8 | 9.26 | 4,300 |
| Do | 28.6 | 19.8 | 240 |

[1] Dry surface consisted of non-connecting "islands" of carbon-filled gels showing infinite surface resistance.

The above data show that the use of expanded graphite as the dispersed conductive medium in painted surfaces yields conductivities many times that of acetylene black at the same carbon concentration in the paint. Expanded graphite yields a more conductive surface compared to the use of graphite flake or graphite powder at many times the carbon concentration in the paint and carbon loading on the painted surface.

Run B

Applying varying thicknesses of a latex paint formulation incorporating expanded graphite (2.56 wt. percent free carbon on wet basis, 4.84 wt. percent carbon on dry film basis) showed the following carbon loading versus surface resistance (9″ x 9″ plywood panels):

TABLE VII

| Panel No.: | Paint wt., gm./ft.² | Carbon loading, gms./ft.² | Surface resistance ohms/square |
|---|---|---|---|
| A | 43.5 | 0.90 | 400 |
| B | 93.0 | 1.92 | 160 |
| C | 135 | 2.80 | 30 |

Run C

An expanded graphite prepared from dilute $HClO_4$-treated flake graphite (−325 mesh) and subsequently expanded to yield a finely divided graphite "fluff" (having a bulk density of 1.5 pounds per cubic foot) was blended into a latex system to yield a 7.34 weight percent free carbon paint (wet basis). A thin coating on a wooden surface yielded a film having a surface resistance of 5000 ohms per 9″ x 9″ square.

Run D

The following paint formulations were blended with expanded graphite having an apparent bulk density of 0.6 pound per cubic foot:

(1) Alkyd paint (Cook No. 9002), white, 100 grams per 5 grams of expanded graphite yielding a 4.75 weight percent free carbon formulation.
(2) Vinyl paint having a MEK solvent, white, 100 grams per 5 grams of expanded graphite yielding a 4.75 weight percent free carbon formulation.
(3) Chlororubber paint (S and W), white, 150 grams per 5 grams of expanded graphite yielding a 3.2 weight percent free carbon formulation.
(4) Butyl-phenolic paint (S and W), blue, 143 grams per 5 grams of expanded graphite yielding a 3.38 weight percent free carbon formulation.

These formulations were then applied on 9″ x 9″ squares and the dried panels yielded the following conductances.

TABLE VIII

| Paint system: | Paint loading (wet), grams | Graphite loading, gms./ft.² | Surface resistance, ohms/square |
|---|---|---|---|
| Alkyd | 52 | 4.4 | 185 |
| Vinyl | 49 | 4.1 | 195 |
| Chloro-rubber | 76 | 4.3 | 66 |
| Butyl-phenolic | 49 | 2.95 | 360 |

EXAMPLE VI

In the following runs electrically conductive structural material were prepared in accordance with the instant invention and in accordance with conventional procedures (Comparison runs).

Run A

About 1 gram of expanded vermicular graphite having an apparent bulk density of about 0.2 lb./ft.$^3$, prepared as described hereinbefore, was dry blended with about 34.4 grams of magnesium oxide powder, the blending being done gently to keep the "breaking-up" of the graphite worms to a minimum. To this mix was added about 30 grams of an aqueous solution containing about 34 weight percent $MgCl_2$. An additional 20 cubic centimeters of water was stirred into the slurry thereby producing a pourable mix. The so-formed slurry was poured into a 2 inch diameter mold and set aside for about 72 hours to cure at ambient temperatures.

The above procedure was repeated by mixing in 2 grams and 4 grams of expanded graphite per 34.4 gram charges of magnesium powder and these slurries were poured into an identical mold and cured for 72 hours.

Comparison run A

A similar set of magnesium oxychloride cements were then prepared by mixing in 1, 2 and 4 grams of acetylene black into the $MgO=MgCl_2$ solution and these samples were cured for 72 hours.

The properties of the cured cements are listed in Table IX below.

TABLE IX

| Sample No. | Amount carbon/34.4 gms. MgO | Bulk density, lbs. ft.$^3$ | Specific resistance, ohm-inches |
|---|---|---|---|
| 1 | 1 gm. expanded graphite | 76 | 3,000 |
| 2 | 2 gms. expanded graphite | 56.6 | 430 |
| 3 | 4 gms. expanded graphite | 36.9 | 20 |
| 4 | 1 gm. acetylene black | 104 | 40,000 |
| 5 | 2 gms. acetylene black | 104 | 1,500 |
| 6 | 4 gms. acetylene black | 110 | 460 |

A carbon-free magnesium oxychloride cement prepared in an identical fashion had a cured density of 104 pounds per cubic foot and a compressive strength of 1380 p.s.i. whereas a conductive magnesium oxychloride cement containing 2.85 weight percent expanded graphite in the cured state had a bulk density of 53.4 pounds per cubic foot and a compressive strength of 982 p.s.i. which calculated to be a 42 percent improvement in the compressive strength-to-weight ratio with the cement containing expanded graphite.

Run B

Vermicular expanded graphite prepared from a commercially available Grade No. 1 natural flake graphite as described hereinbefore and having an apparent bulk density of about 1 lb./ft.$^3$ was gently dry blended with finely powdered anhydrous calcium sulfate (plaster of Paris). Three batches were prepared having the following weight ratio of expanded graphite to anhydrous calcium sulfate:

(1) about 5 grams expanded graphite per 50 grams $CaSO_4$, (2) about 10 grams expanded graphite per 50 grams $CaSO_4$, and (3) about 15 grams expanded graphite per 50 grams $CaSO_4$.

To each dry mix was then stirred enough water to yield a wet, pourable mixture and then each of the graphite-containing mixes was cast into paper mold to yield a solid cylinder casting and set aside to dry.

Comparison run B

Similar batches of plaster were prepared containing unexpanded flake graphite as the electrical conductivity imparting medium. The following compositions were dry-mixed:

(4) Five grams of −200 mesh natural flake powder (Dixon No. 635) plus 50 grams anhydrous $CaSO_4$ powder.

(5) Five grams of Grade No. 1 natural flake graphite plus 50 grams $CaSO_4$.

(6) 15 grams of Grade No. 1 natural flake graphite plus 50 grams $CaSO_4$.

(7) 30 grams of Grade No. 1 natural flake plus 50 grams $CaSO_4$.

Each of the above mixes were then mixed with sufficient water to yield a flowable slurry and was then cast into a paper mold to yield a solid cylinder casting.

The properties of conductive plaster mixes (after 4 days of air drying at room temperature) are tabulated below in Table X.

TABLE X

| Sample No. | Type graphite | Weight percent graphite in dry mix | Bulk density of cured cast, lbs./ft.$^3$ | Specific resistance, ohm-inches |
|---|---|---|---|---|
| 1 | Expanded | 9.1 | 35.4 | 1,400 |
| 2 | do | 16.7 | 38.6 | 12 |
| 3 | do | 23.1 | 33.4 | 4 |
| 4 | Flake Powder (Dixon No. 635) | 9.1 | 66.6 | 7,000 |
| 5 | No. 1 Grade Natural Flake | 9.1 | 80.0 | 70,000 |
| 6 | do | 23.1 | 68.6 | 15,000 |
| 7 | do | 37.5 | 71.6 | 1,800 |

Run C

Expanded graphite, having an apparent bulk density of 2 pounds per cubic foot, was compressed slightly in a 5½-inch diameter mold to yield a solid cylinder preform weighing about 20 grams. Then about 100 cubic centimeters of 40° Bé. sodium silicate solution (water glass) was premixed with 150 cubic centimeters of water to yield a low-viscosity fluid. The mixed solution was poured over the expanded graphite preform and allowed to totally soak into the mass. The excess liquid was drained off, the shaped silicate-wetted graphite was placed in an oven and heated to temperatures between 100° and 200° C. for about 16 hours. The resulting silicate-bonded graphite shape contained 34.5 weight percent graphite and had an apparent bulk density of 8.8 pounds per cubic foot. The specific resistance of this product was 0.36 ohm-inch.

Run D

Portland cement, coarse sand, and expanded graphite (having a bulk density of about 0.8 pound per cubic foot) were premixed dry (Portland cement to sand weight ratio=1:1), then enough water was mixed in to yield a castable slurry. The cured product containing about 15.4 weight percent expanded graphite had a specific resistance of about 32.5 ohms and a bulk density of about 30.5 pounds per cubic foot.

A similar mixture of Portland cement, sand, and acetylene black yielded a cured aggregate containing about 15.8 weight percent free carbon which had a specific resistance of about 80 ohm-inches.

EXAMPLE VII

A heated pavement was prepared in accordance with the instant invention as follows:

A mixture was prepared by admixing 100 parts of pavement grade asphalt with 20 parts of toluene and 10 parts of expanded graphite having a bulk density of about 0.2 lb./ft.$^3$. This mixture was laid down in a strip 4 inches wide and 10 feet long on a concrete slab. At each end of the strip, copper electrodes were buried in the graphite-containing asphalt layer The strip was allowed to cure for a period of 2 days in order to permit toluene to evaporate therefrom. A topping of unadulterated pavement grade asphalt was then laid over the graphite-containing strip. The entire system was allowed to harden and air cure for a period of 2 weeks thereafter.

Alternating electric current at 110 volts and 75 amperes was applied to the two electrodes. Heat was generated by the graphite-containing asphalt interlayer at a rate of about 7 B.t.u. per square foot per hour.

EXAMPLE VIII

A carbon-bonded expanded vermicular graphite brick was prepared in the following manner.

About 35 grams of an expanded graphite prepared as described hereinbefore having a bulk density of about 0.2 lb./ft.$^3$ were mixed with 560 grams of 1:1 weight ratio of natural asphalt and xylene. The blended plastic mixture was compressed into a mold to about ½ of its original volume. The molded mixture was slowly heated to about 200° C. over a time interval of about 8 hours and then slowly heated to about 1000° C. under a loose pile of carbon black during a period of about 4 hours. The resulting carbon-bonded expanded graphite brick had the following properties:

Bulk density of about 4.0 lbs./ft.$^3$
Gas permeability of about 38 ft.$^3$ of air/ft.$^2$/inch/min./2 inch $H_2O$ pressure
Thermal conductivity of about 2.2 B.t.u./hr./ft.$^2$/° F./inch
Specific resistance of about 0.071 ohm inch.

EXAMPLE IX

The following procedure was carried out to illustrate the instant method in producing improved battery cathode compositions.

Various forms of graphite including an expanded graphite having an initial bulk density of about 0.6 lbs./ft.$^3$ prepared as described in Example I, fine graphite powder (Dixon No. 635) having a particle size of less than 325 mesh, and acetylene black powder, were admixed in various quantities with various cathode reducible compounds including manganese dioxide powder, vanadium pentoxide, silver oxide, mercuric oxide, and silver bromide. These mixtures were prepared at various free carbon levels. The blended product was compressed in a 1-inch diameter die to about 2,000 p.s.i. to yield cylindrical compacts. The specific resistances of these compacts were measured and are listed in Table XI.

TABLE XI.—SPECIFIC RESISTANCE OF VARIOUS GRAPHITE COMPACTS

| Cathode reducible compound | Weight percent free carbon | Expanded graphite, ohm-inches | Graphite powder, ohm-inches | Acetylene black, ohm-inches |
|---|---|---|---|---|
| Manganese dioxide | 5 | 60.886 | 356 | 47.1 |
| | 15 | 0.204 | 0.73 | 1.79 |
| | 25 | 0.0105 | 0.21 | 0.765 |
| Vanadium pentoxide | 5 | 1.25 | 314 | 31 |
| | 15 | 0.314 | 0.393 | 7.55 |
| | 25 | 0.215 | 0.288 | 2.83 |
| Silver oxide | 9 | 0.140 | 0.555 | |
| Mercuric oxide | 5 | 0.189 | 10.4 | |
| | 15 | 0.150 | 0.350 | |
| | 25 | 0.135 | 0.153 | |
| Silver bromide | 5 | 0.224 | 0.655 | 1.03 |

In all cases the expanded graphite had a lower specific resistance at a given free carbon level than did the graphite powder and acetylene black.

Comparisons were made on the behavior of the mercuric oxide and silver bromide compacts as cathodes in fabricated cells under current drain conditions. The 95 weight percent mercuric oxide and 95 percent silver bromide slugs containing 5 weight percent fine graphite powder or 5 weight percent expanded graphite were each fitted within a one-inch I.D. by ¼ inch thick plexiglass retaining ring so that only the upper and lower surface of the slug would be exposed. These slugs were each in turn pressed against the surface of a one-inch wide strip of silver foil lying on the bottom of a 100 cc. beaker. Next, a porous paper was placed between the cathode and an anode consisting of a ½-inch diameter magnesium alloy rod pressed upon the cathode. Finally about 50 cubic centimeters of saturated aqueous potassium chloride solution was poured into the beaker to complete the battery.

Resistors of various values were placed across the terminal of these batteries and the resulting cell current and cell potentials were recorded as shown in Table XIa.

TABLE XIa

| Type of battery | Load, resistor, ohms | Cell current, amps | Cell potential, volts |
|---|---|---|---|
| HgO—5% expanded graphite | 10 | 0.52 | 1.42 |
| | 5 | 0.76 | 1.34 |
| | 2.5 | 1.27 | 1.23 |
| | 1.25 | 1.80 | 1.13 |
| HgO—5% graphite powder | 10 | 0.46 | 1.20 |
| | 5 | 0.72 | 1.14 |
| | 2.5 | 1.05 | 1.00 |
| | 1.25 | 1.30 | 0.87 |
| AgBr—5% expanded graphite | 20 | 0.25 | 1.41 |
| | 10 | 0.45 | 1.37 |
| | 5 | 0.78 | 1.32 |
| | 2.5 | 1.30 | 1.24 |
| | 1.25 | 2.05 | 1.15 |
| AgBr—5% graphite powder | 20 | 0.21 | 1.39 |
| | 10 | 0.37 | 1.30 |
| | 5 | 0.66 | 1.20 |
| | 2.5 | 1.15 | 1.18 |
| | 1.25 | 1.80 | 1.08 |

In all cases presented, the expanded graphite cathode cell consistently showed higher cell currents and potentials over the graphite powder cathode under given resistance loads.

Various modifications may be made to the present invention without departing from the spirit or scope thereof, for it is to be understood that we limit ourselves only as defined in the appended claims.

We claim:

1. A method of rendering normally substantially nonconductive materials conductive which comprises (a) providing a supply of vermicular expanded graphite having an apparent bulk density of less than about 2 pounds per cubic foot, (b) compressing said vermicular expanded graphite into a predetermined shape, said compression being sufficient to reduce the volume of the expanded vermicular graphite by a factor of from 2 to 20, (c) providing a supply of a liquid hardenable organic polymer, (d) absorbing sufficient of said liquid hardenable organic polymer into said compressed graphite structure to equal 60 to 99.95 percent of the total structure, and (e) treating said liquid hardenable organic polymer to cause hardening and produce thereby a rigid, conductive product.

2. The method of claim 1 wherein the liquid hardenable organic polymer is a member selected from the group consisting of polystyrene, epoxy resins, polyesters, polyurethanes, phenol-formaldehyde polymers, urea-formaldehyde polymers and silicone rubbers.

3. A method for producing electrically conductive, light weight materials from relatively non-conductive, relatively dense materials which comprises (a) intimately admixing a cementing char-producing organic material with vermicular expanded graphite having an apparent bulk density of less than 2 pounds per cubic foot in a weight ratio of from 1:3 to 1:12 graphite to organic material, and (b) pyrolyzing said mixture at a temperature of at least 900° C. to produce a lightweight, electrically conductive product.

4. The method of claim 3 wherein the cementing char-producing organic material is a member selected from the group consisting of asphalt, tar, sugars and organic polymers.

5. A method of preparing a battery cathode composition which comprises (a) providing a supply of unexpanded flake graphite, (b) blending said graphite with a finely divided powder form of a cathode-reducible compound, said graphite being present in an amount of from about 2 to about 40 weight percent of the cathode-reducible compound, (c) treating said graphite and cathode-reducible compound mix with an oxidizing acid, (d) heat-expanding said graphite, and (e) compressing said blend at pressures within the range of from about 100 to about 25,000 pounds per square inch in predetermined directions into predetermined forms.

6. The method of claim 5 wherein the cathode-reducible compound is selected from the group consisting of manganese dioxide, vanadium pentoxide, silver oxide, silver halides, mercury salts, lead oxide, cuprous oxide and chromium oxide.

References Cited

UNITED STATES PATENTS

| | | | |
|---|---|---|---|
| 442,336 | 12/1890 | Roberts | 136—121 |
| 1,191,383 | 7/1916 | Aylsworth | 264—29 |
| 2,230,267 | 2/1941 | Ruben | 136—121 |
| 2,782,180 | 2/1957 | Weidman | 136—122 |
| 2,799,051 | 2/1957 | Coler et al. | 252—511 |

WINSTON A. DOUGLAS, Primary Examiner

A. SKAPARS, Assistant Examiner

U.S. Cl. X.R.

136—121; 264—29, 105, 127